United States Patent
Shanmugam et al.

(10) Patent No.: US 10,882,490 B2
(45) Date of Patent: Jan. 5, 2021

(54) CONTROL METHOD FOR AN ELECTRIC SEATBELT RETRACTOR AND ELECTRIC SEATBELT RETRACTOR

(71) Applicant: AUTOLIV DEVELOPMENT AB, Vargarda (SE)

(72) Inventors: Saravana Shanmugam, Bangalore (IN); Abhijeet Atwadkar, Bangalore (IN); Vijay Shetty, Bangalore (IN); Thouseef Aqeeb, Bangalore (IN); Andreas Lucht, Horst (DE); Geert Helge Wittenberg, Norderstedt (DE); Carstensen Holger, Husum (DE); Patrick Süllau, Henstedt-Ulzburg (DE); Günter Clute, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 77 days.

(21) Appl. No.: 16/072,719

(22) PCT Filed: Jan. 16, 2017

(86) PCT No.: PCT/EP2017/050769
§ 371 (c)(1),
(2) Date: Jul. 25, 2018

(87) PCT Pub. No.: WO2017/129431
PCT Pub. Date: Aug. 3, 2017

(65) Prior Publication Data
US 2019/0092277 A1 Mar. 28, 2019

(30) Foreign Application Priority Data
Jan. 29, 2016 (EP) ..................... 16153300

(51) Int. Cl.
*B60R 22/46* (2006.01)
*B60R 22/48* (2006.01)
(Continued)

(52) U.S. Cl.
CPC .............. *B60R 22/48* (2013.01); *B60R 22/44* (2013.01); *B60R 22/46* (2013.01); *H02K 7/14* (2013.01);
(Continued)

(58) Field of Classification Search
CPC .......... B60R 22/44; B60R 22/46; B60R 22/48
See application file for complete search history.

(56) References Cited

U.S. PATENT DOCUMENTS 6,848,644 B2 * 2/2005 Eberle .................... B60R 22/44
242/374
6,848,717 B2 * 2/2005 Bullinger ................ B60R 22/46
242/390.9

(Continued)

FOREIGN PATENT DOCUMENTS

| EP | 2 130 725 A1 | 9/2009 |
| EP | 2 214 943 B1 | 8/2010 |
| JP | H10-167002 A | 6/1998 |

OTHER PUBLICATIONS

International Search Report of PCT/EP2017/050769 dated Mar. 22, 2017.

*Primary Examiner* — Sang K Kim
(74) *Attorney, Agent, or Firm* — Dickinson Wright PLLC

(57) ABSTRACT

A control method for an electric seatbelt retractor and an electric seatbelt retractor including a spindle (2) and a seatbelt (3) wound thereon, and an electric motor (4) driving the spindle (2) via a rotor (3) in pull-in or in pull-out direction when activated, and a sensor device (10) detecting the movement of the spindle (2), wherein a spring (11) is provided, which is arranged between the spindle (2) and the
(Continued)

rotor (3) enabling a relative movement of the spindle (2) to the rotor (3) or to a retractor-fixed part, wherein the electric motor (4) is controlled by a signal of the sensor device (10) generated by the relative movement of the spindle (2) to the rotor (3) or a retractor-fixed part with torsional tensioning or expanding the spring (11).

8 Claims, 17 Drawing Sheets

(51) Int. Cl.
    *B60R 22/44* (2006.01)
    *H02K 11/215* (2016.01)
    *H02K 7/14* (2006.01)

(52) U.S. Cl.
    CPC .... *H02K 11/215* (2016.01); *B60R 2022/4473* (2013.01); *B60R 2022/4666* (2013.01); *B60R 2022/4825* (2013.01)

(56) References Cited

U.S. PATENT DOCUMENTS

| | | | |
|---|---|---|---|
| 6,851,716 B2 * | 2/2005 | Bullinger | B60R 22/44 242/374 |
| 7,992,691 B2 | 8/2011 | Maron et al. | |
| 8,141,808 B2 * | 3/2012 | Maemura | G01D 5/145 242/422.2 |
| 8,397,879 B2 | 3/2013 | Maron et al. | |
| 8,960,585 B2 * | 2/2015 | Ikeda | B60R 22/44 242/390.8 |
| 2003/0224887 A1 | 12/2003 | Bullinger et al. | |

* cited by examiner

CONTROL METHOD FOR AN ELECTRIC SEATBELT RETRACTOR AND ELECTRIC SEATBELT RETRACTOR

CROSS-REFERENCE TO RELATED APPLICATIONS

This application is a 35 U.S.C. § 371 national phase application of PCT International Application No. PCT/EP2017/050769, filed Jan. 16, 2017, which claims the benefit of priority under 35 U.S.C. § 119 to European Patent Application No. 16153300.5, filed Jan. 29, 2016, the contents of which are incorporated herein by reference in their entirety.

FIELD OF THE INVENTION

The invention relates to a control method for an electric seatbelt retractor for a motor vehicle belt restraint system.

BACKGROUND

Typical seatbelt systems in vehicles include a seatbelt retractor, a vehicle-fixed buckle and a seatbelt with a slidable tongue which may be locked in the buckle. The seatbelt retractor includes a spindle onto which the seatbelt is wound up and which may rotate in a frame in the pull-in (retraction) as well as in the pull-out direction (extraction) of the seatbelt. The retractor is further provided with a blocking device for blocking the spindle in the pull-out direction when a predetermined value of the seatbelt pull-out speed (belt sensitive locking) or a predetermined value of the vehicle deceleration (vehicle sensitive locking) is exceeded. The blocking device is triggered by a mechanical seatbelt acceleration sensor and by a mechanical vehicle deceleration sensor. Furthermore, it is known to provide the seatbelt retractor with irreversible and reversible pretensioning devices, which pull out a possible slack of the seatbelt in a precrash situation or in an early phase of the crash to couple the occupant closer to the vehicle deceleration. The reversible pretensioner is typically realized in modern seatbelt systems by an electric motor, which may be coupled with the spindle by a clutch. The clutch is engaged for example by friction or inertia forces when the electric motor is activated.

As providing an electric motor increases the price of the seatbelt retractor significantly, it is intended to use the electric motor for as many functions as possible, for example also to support the retracting movement into the parking position or to reduce the retracting force for comfort reasons or the like.

Furthermore, the seatbelt retractor needs to be provided with a sensor device which provides a signal for controlling the electric motor. The sensor devices in typical existing seatbelt retractors are realized by magnetic wheels with a plurality of magnet poles with different polarization, which are fixed at the spindle. The magnet poles are formed with identical dimensions and are arranged at the circumference of the magnetic wheel in a regular arrangement. Furthermore, the sensor devices includes a sensor, for example a Hall effect sensor, which is positioned face to the magnet poles of the magnetic wheel at a frame of the retractor. The sensor device detects the rotational movement of the spindle, wherein the detected rotational angle or the detected revolutions are used to trigger the electric motor, wherein the signal may be further processed in a CPU (central processing unit). The rotational movement or the rotational position of the spindle is used here also as a representative signal for the seatbelt pull-out length, which is the essential criterion for the activation of the electric motor for extraction and retraction of the seatbelt.

In view of the above background, it is the object of the present invention to provide a control method for an electric seatbelt retractor and to provide an electric seatbelt retractor with a control mechanism which enables an easy and reliable operation of the electric seatbelt retractor.

The object of the invention is solved by a control method and by an electric seatbelt retractor having features described herein and shown by the appended drawing figures.

SUMMARY AND INTRODUCTORY DESCRIPTION OF EMBODIMENTS OF THE INVENTION

According to a feature of the control method of the present invention, it is suggested that a spring is provided, which is arranged between the spindle and the electric motor rotor enabling a relative movement of the spindle to the rotor, wherein the electric motor is controlled by a signal of the sensor device generated by the relative movement of the spindle to the rotor or a fixed part of the retractor with torsional tensioning or expanding the spring.

Embodiments exhibit two steps. According to the first step, a spring is provided between the spindle and the rotor which enables a relative movement between both parts. According to the second step, the electric motor is controlled by a signal which is generated by the sensor device when the spindle performs a relative movement to the rotor or a fixed part of the retractor, which is enabled by the spring arranged in between. During the relative movement, the spring may be tensioned or expanded, wherein in the case of expanding the relative movement may be initiated by the expanding spring. In this case the spindle is driven by the spring.

According to a preferred embodiment of the present invention, the spring is tensioned by a first relative movement of the spindle to the rotor in a first direction, and the tensioned spring drives the spindle subsequently to a second relative movement in a second direction, which is oriented opposite to the first direction, wherein the sensor device generates a signal when detecting the second movement of the spindle, by which the electric motor is activated to drive the spindle in the second direction. The advantage of the suggested embodiment is that the spring is tensioned by a relative movement like for example the extraction of the seatbelt, and that the relative movement is performed in a second step when the spring is expanding afterwards and drives thereby the spindle in the opposite direction. The spring is acting in this case as an energy storage element which is loaded during the movement of the spindle before. In a second step, the energy in the spring is used afterwards to drive the spindle for example rotation of 5 to 20 degrees to the rotor in the opposite direction for generating a signal by the sensor device. This short movement of the spindle which is initiated by the tensioned spring is detected then by the sensor device to trigger the electric motor which drives the spindle further in the same direction.

Furthermore, the electric motor is activated preferably in the pull-out direction of the seatbelt when the sensor device detects a relative movement of the spindle in the pull-out direction to the rotor when the seatbelt is pulled out from a parking position. When the seatbelt is in the parking position, the spring is expanded in a neutral position. When the seatbelt is pulled out from the parking position, the spindle turns versus the non-rotating rotor with torsional tensioning the spring, so it performs a relative movement in the pull-out direction with respect to the rotor. This relative movement of the spindle to the rotor is detected by the sensor device which triggers then the electric motor to drive the rotor and the spindle further in the pull-out direction.

Furthermore, the electric motor is activated in the pull-in direction of the seatbelt after buckling up of the seatbelt. The seatbelt is pulled in to remove possible slack out of the seatbelt so that the seatbelt is abutting afterwards as close as possible at the occupant. The electric motor acts in this case as a reversible pretensioner, which tensions the seatbelt each time after buckling up.

Furthermore, the electric motor is activated preferably in the pull-in direction of the seatbelt when the sensor device detects a relative movement of the spindle in the pull-in direction to the rotor after unbuckling the seatbelt from a vehicle-fixed buckle. The electric motor is used in this case for retracting the seatbelt into the parking position after unbuckling and after the relative movement of the spindle has been detected.

According to another preferred solution in accordance with the present invention, the spring is tensioned to load the spindle in the pull-in direction before releasing the seatbelt from the vehicle-fixed buckle against the pull-in direction of the seatbelt, and the spring drives the spindle after releasing the seatbelt in the pull-in direction, and the electric motor is activated by a signal of the sensors detecting the rotation of the spindle in the pull-in direction to drive the spindle in the pull-in direction. The advantage of the suggested solution can be seen therein that the tensioned spring drives the spindle automatically in the pull-in direction versus the rotor and versus the retractor-fixed part after the seatbelt has been released from the buckle. This relative movement of the spindle versus the rotor or versus the retractor-fixed part may be used afterwards to provide a signal in the sensor device for triggering the electric motor to drive the spindle subsequently further to retract the seatbelt into the final parking position. After buckling up of the seatbelt, the seatbelt is pulled-in for a maximum of length as close as possible to the torso of the occupant. The torsional tensioning of the spring may then also accommodates short movements of the occupant in a forward direction during the normal use for example by operating the radio, active movements when driving or when reaching the glove compartment or the like. Because of these short movements of the occupant the spring is tensioned when the seatbelt is locked in the buckle with respect to the rotor or with respect to the retractor-fixed part in the pull-in direction. As the seatbelt is pulled-out at least for a minimum of length in most of the cases during normal use and especially in the time period just before unbuckling because of the movement of the occupant, this movement is used to tension the spring and to load the spindle in the pull-in direction. When the occupant releases the tongue in this case from the buckle, the spindle is automatically rotated in the pull-in direction by the tensioned spring. This movement can then be used to generate the signal and to trigger the electric motor to retract the seatbelt.

Furthermore, it is suggested that the spindle includes an abutment for the rotor which limits the relative movement of the spindle to the rotor. The abutment may be used for example to transmit the driving movement directly from the rotor to the spindle. Alternatively, the abutment may be also so used as part of a webbing sensitive blocking mechanism when the seatbelt pull-out acceleration exceeds a predetermined value. The electric motor is blocked or deactivated in this case, so that the spindle is blocked by the abutment which is abutting at the blocked rotor.

Furthermore, it is suggested that the sensor device includes a sensor and a magnetic wheel, wherein the sensor is fixed at a frame of the retractor, and the magnetic wheel is fixed at the spindle. The advantage of the solution is a very easy and reliable attachment of the sensor. The sensor detects in this case the relative movement of the spindle versus the frame which is here the retractor-fixed part. As the electric motor and the rotor do not perform any movement when the electric motor is not activated, the movement of the spindle with respect to the rotor is identical to the movement of the spindle with respect to the frame and any other retractor-fixed part. The magnetic wheel is attached to the spindle and is used to create the signal in the sensor when rotating together with the spindle.

The magnetic wheel is provided preferably with a plurality of single magnets having different polarities, which are arranged at a common diameter with alternating poles.

BRIEF DESCRIPTION OF THE DRAWINGS

In the following the invention shall be illustrated on the basis of preferred embodiments with reference to the accompanying drawings, wherein:

FIGS. 3(a)-17(d) show the spindle, the rotor and the spring of the electric seatbelt retractor first in an assembled view and further shown the components separated from each other in different positions from extracting the seatbelt from the parking position to retracting the seatbelt into the parking position.

DETAILED DESCRIPTION

Figure 1:
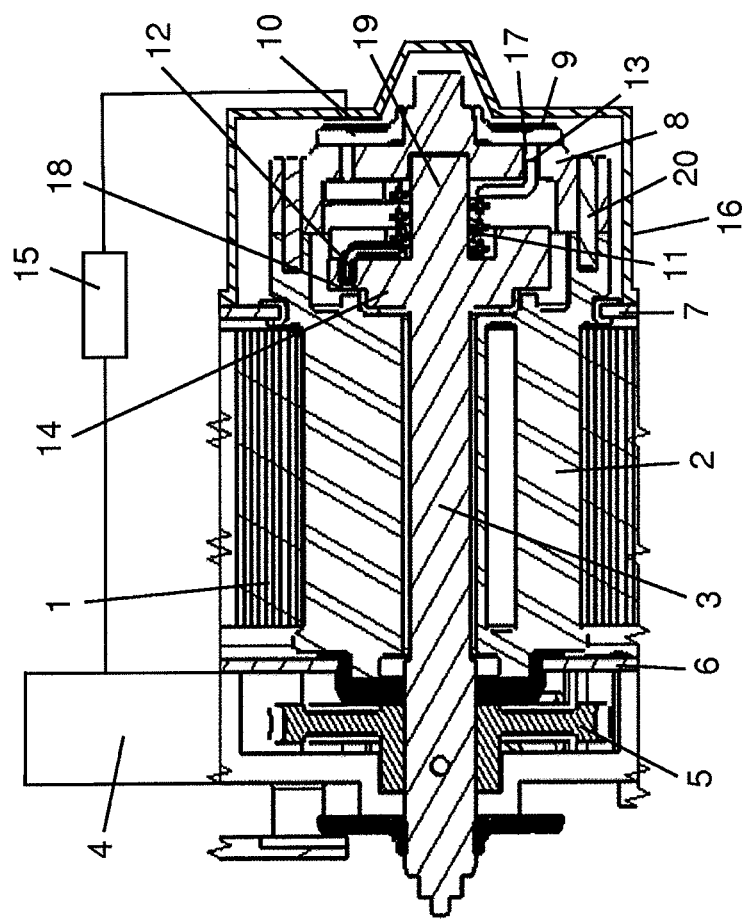
FIG. 1 shows a cross-section of the electric seatbelt retractor.
Figure 3:
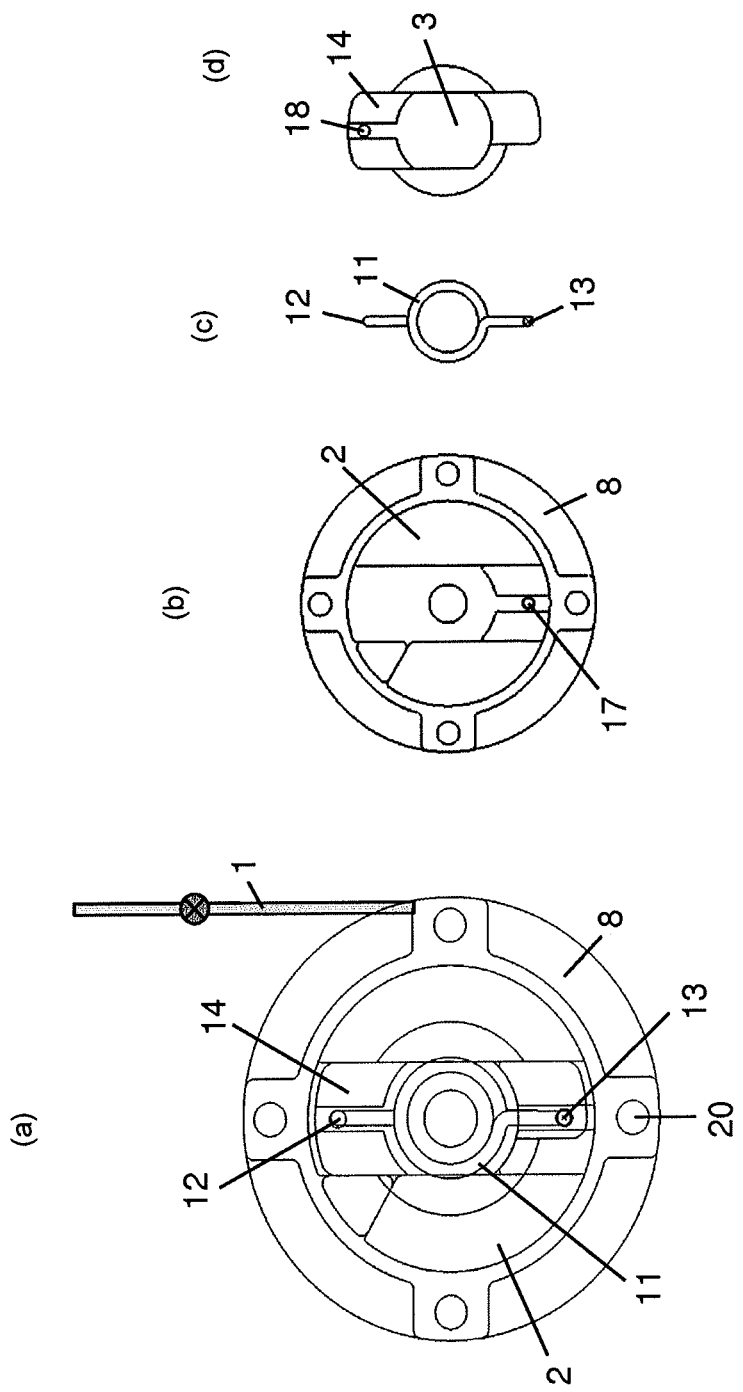
Figure 4:
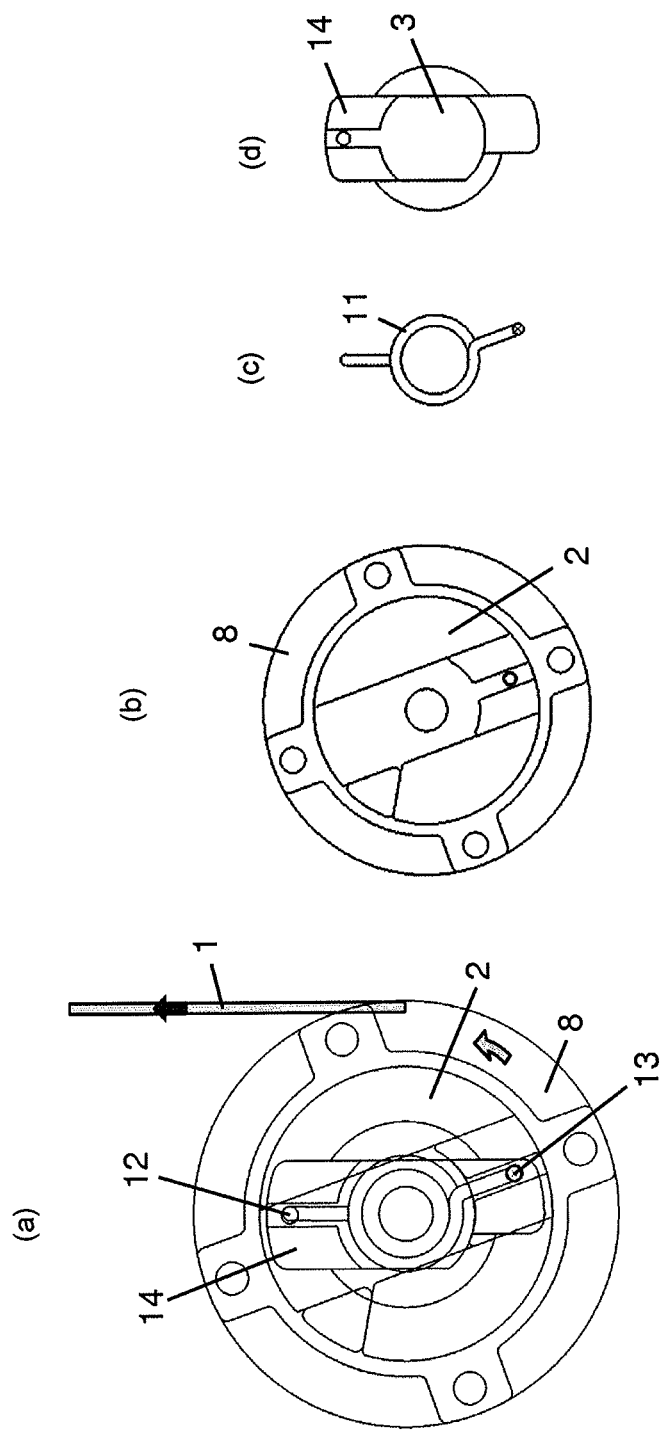
Figure 5:
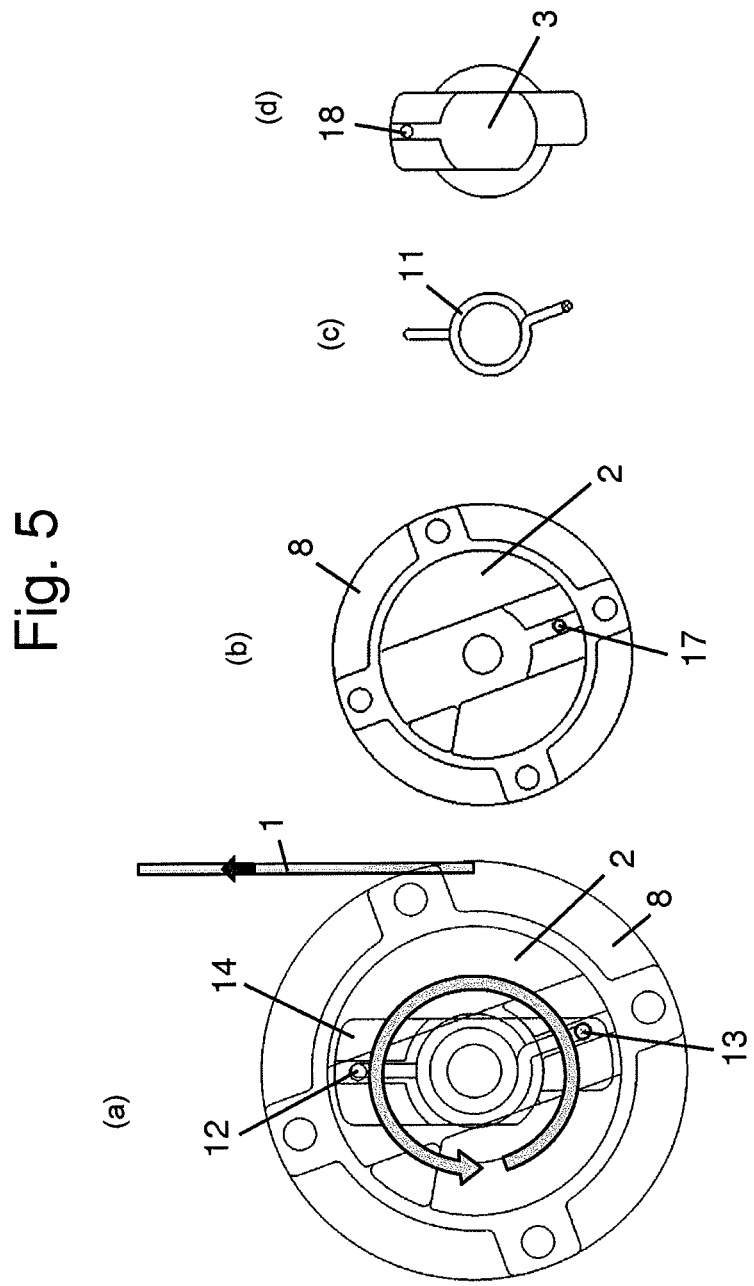
Figure 6:
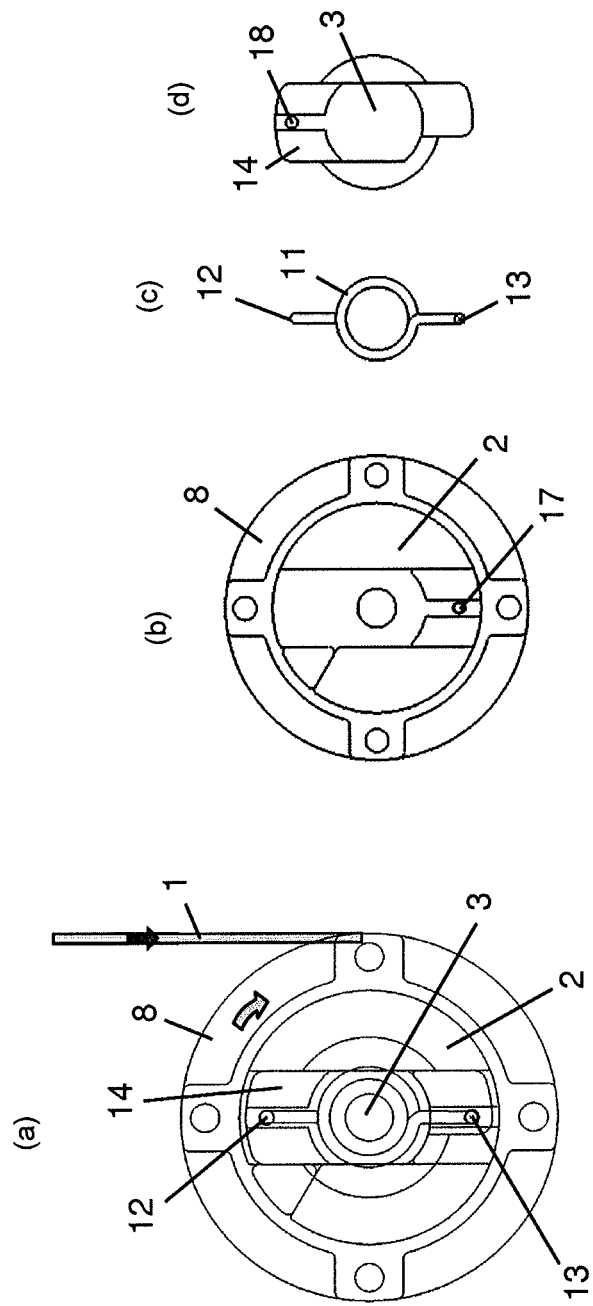
Figure 7:
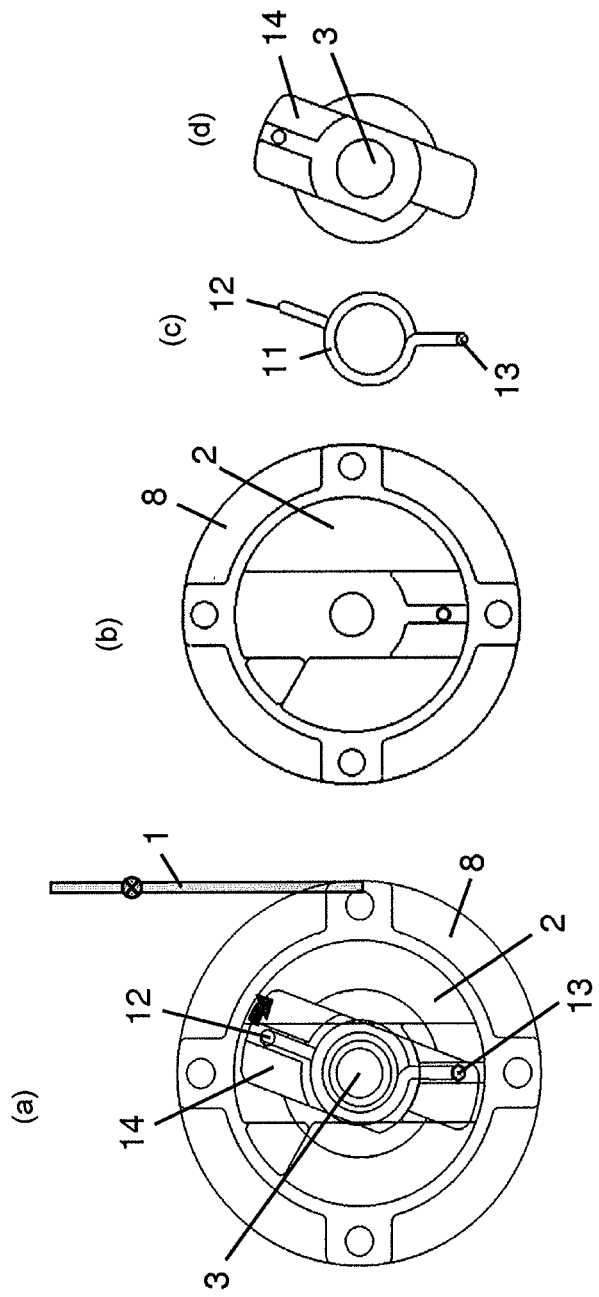
Figure 8:
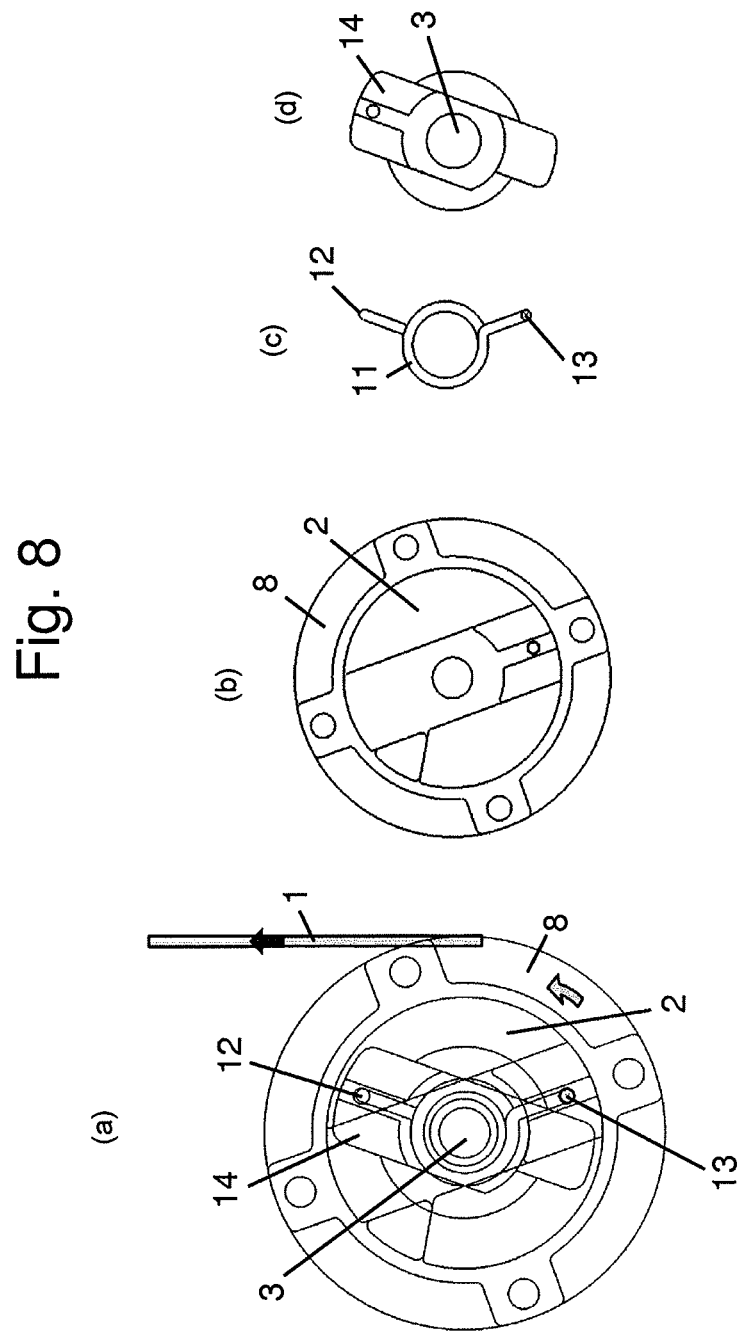
Figure 9:
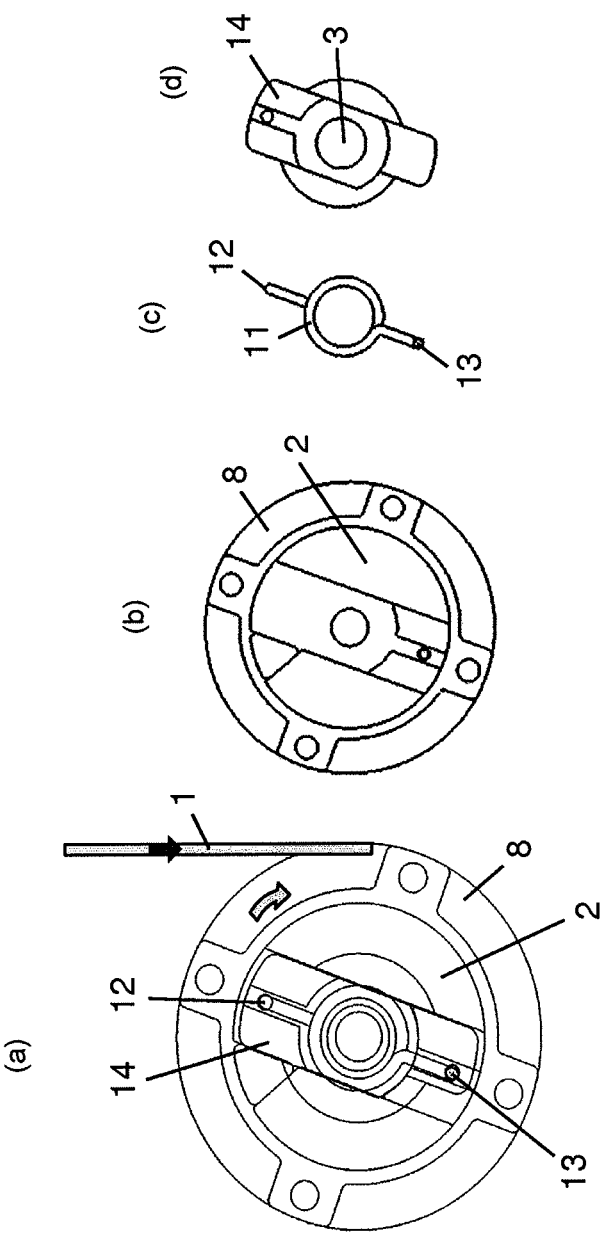
Figure 10:
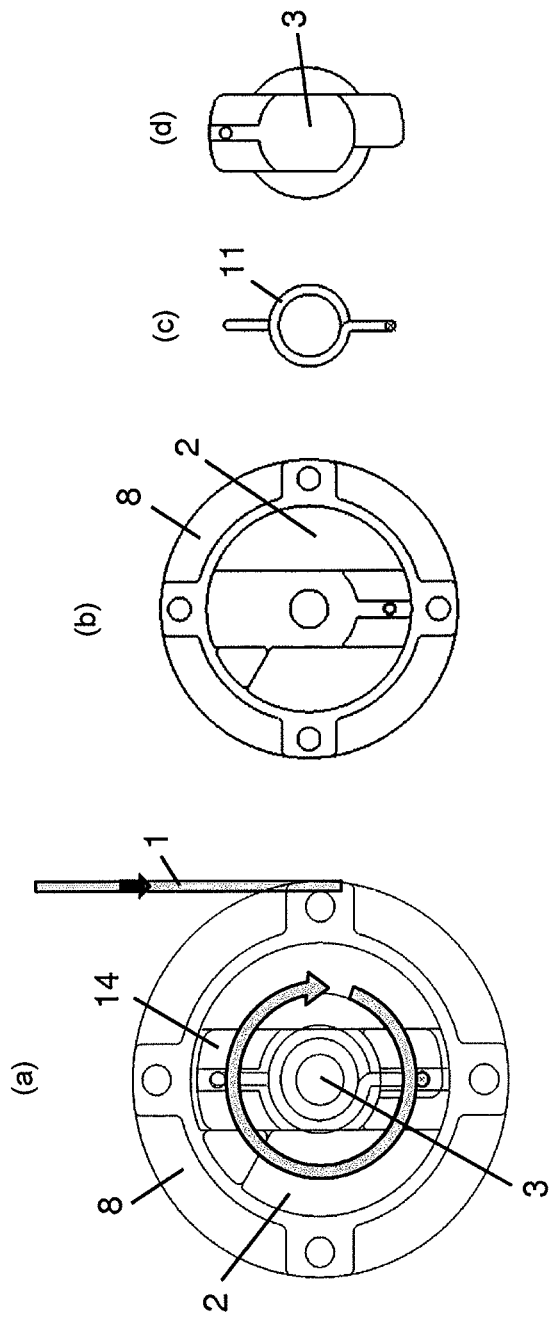
Figure 11:
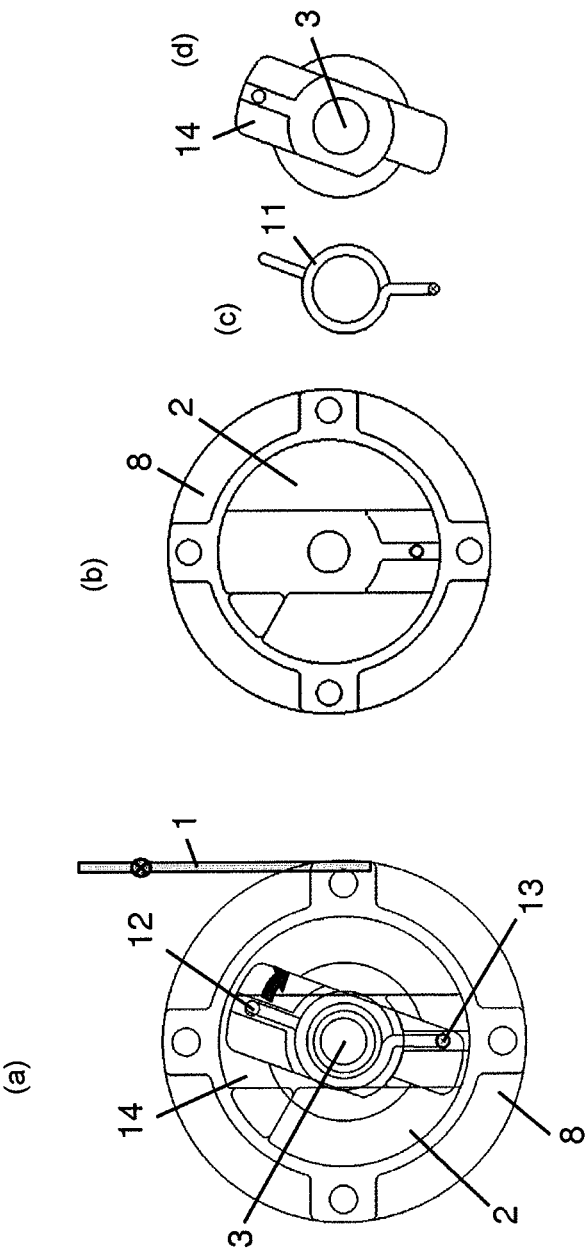
Figure 12:
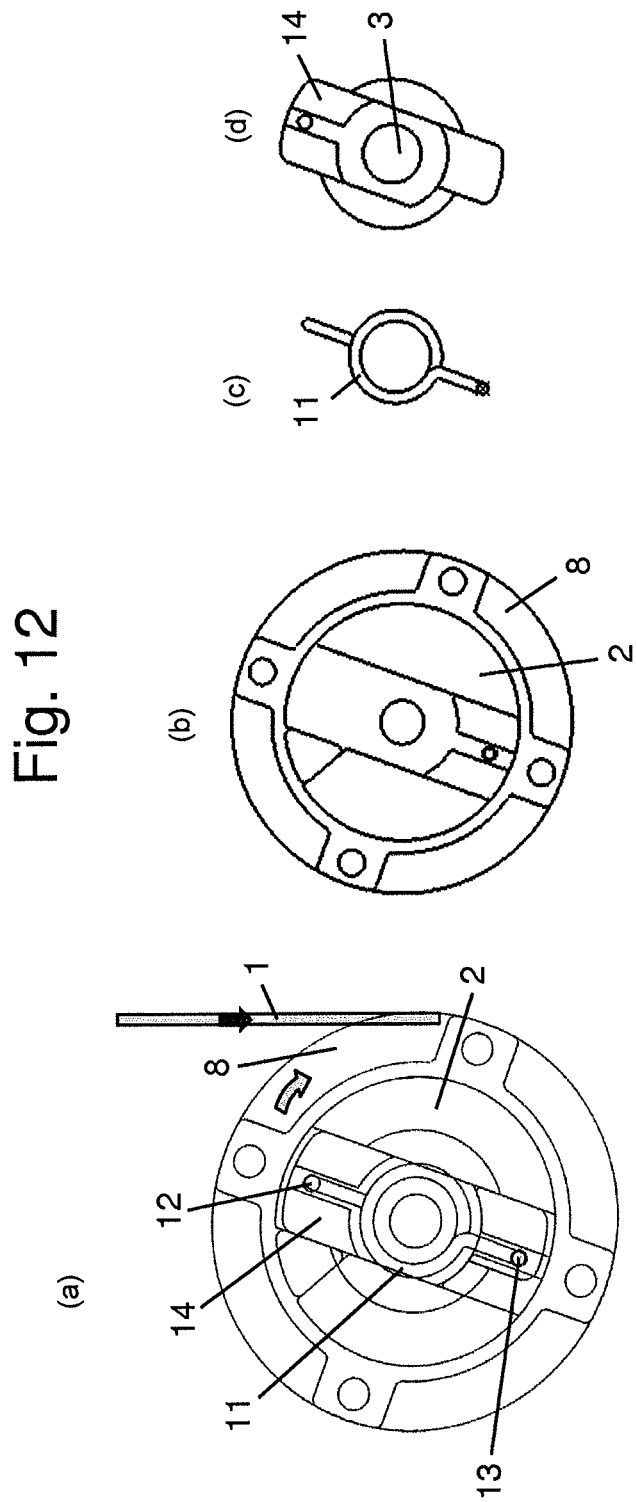
Figure 13:
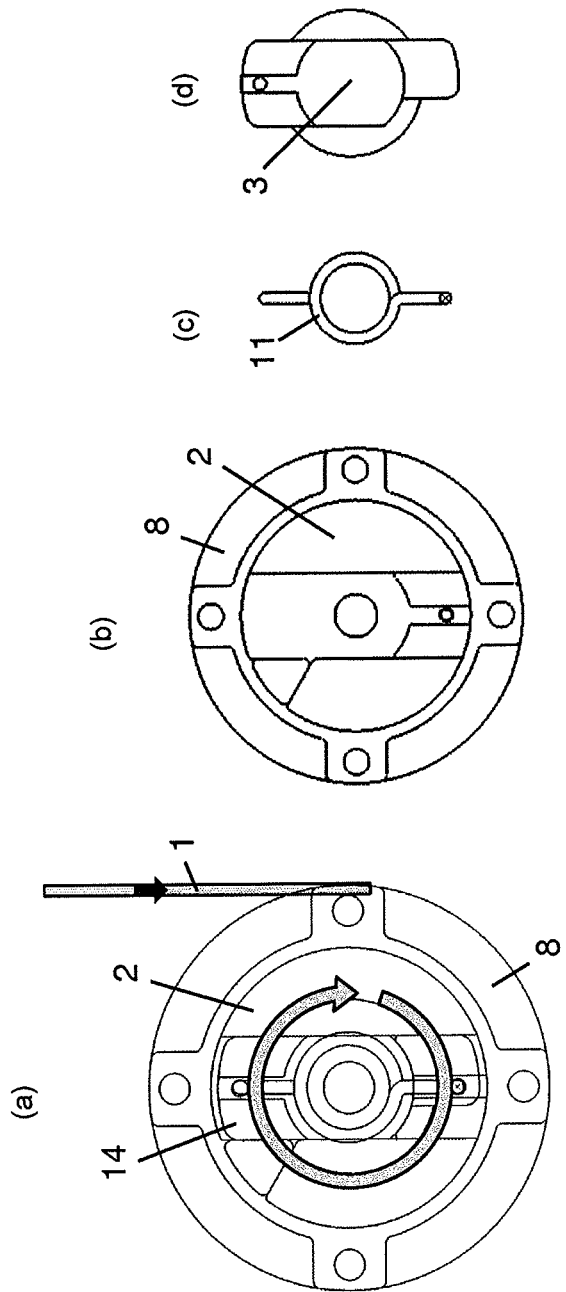
Figure 14:
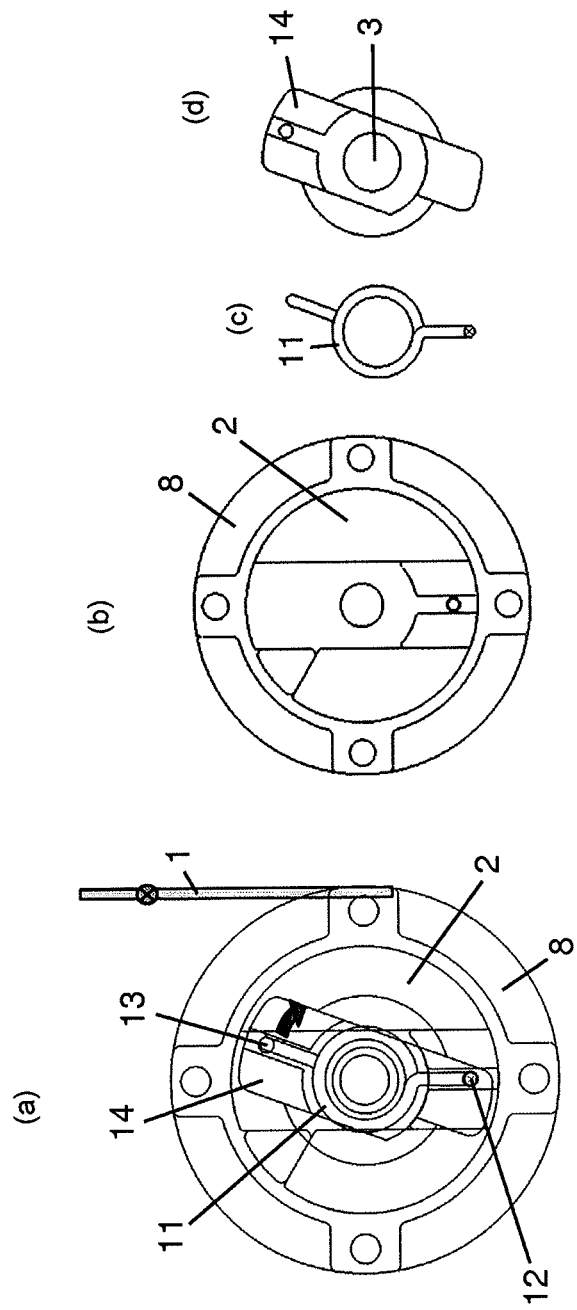
Figure 15:
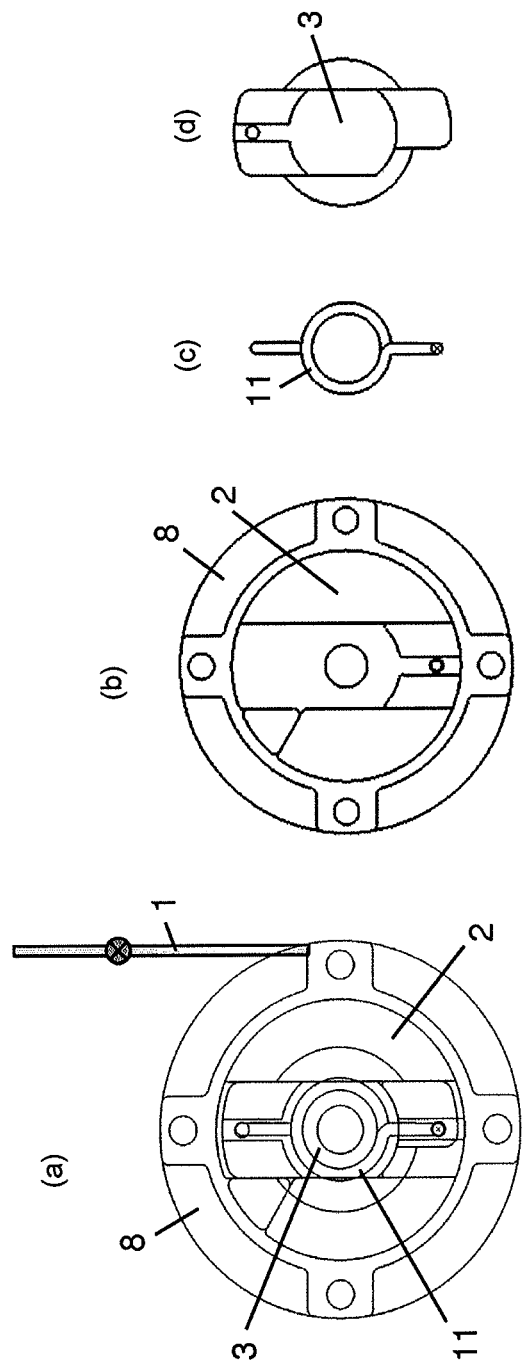
Figure 16:
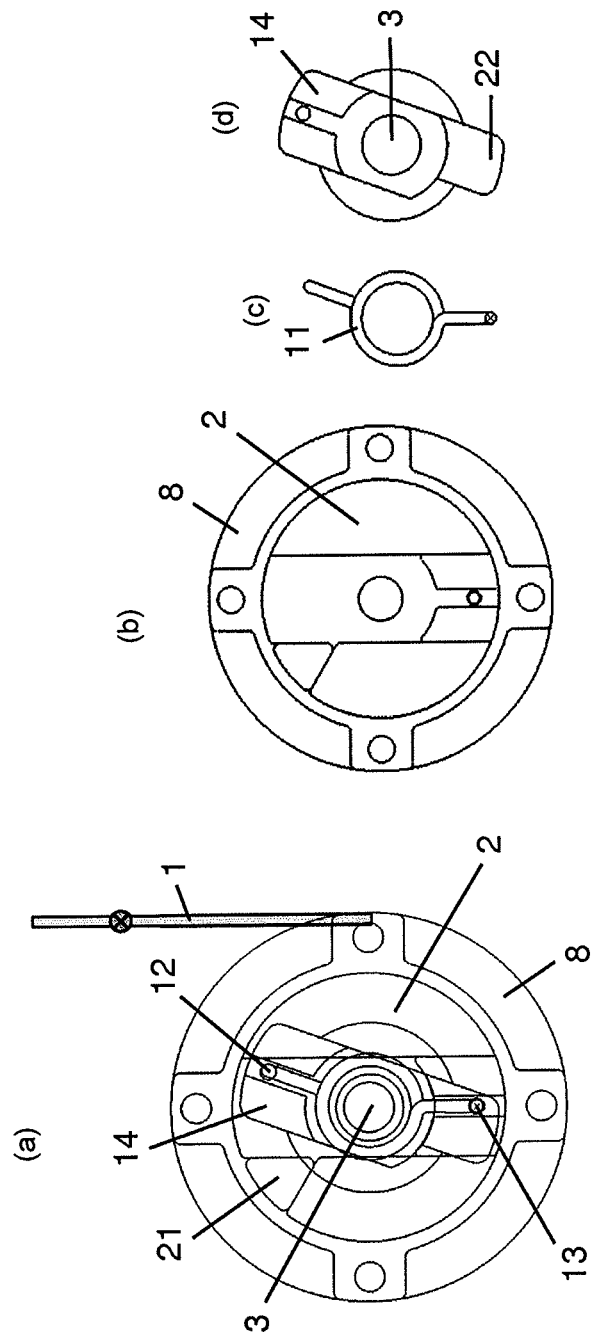
Figure 17:
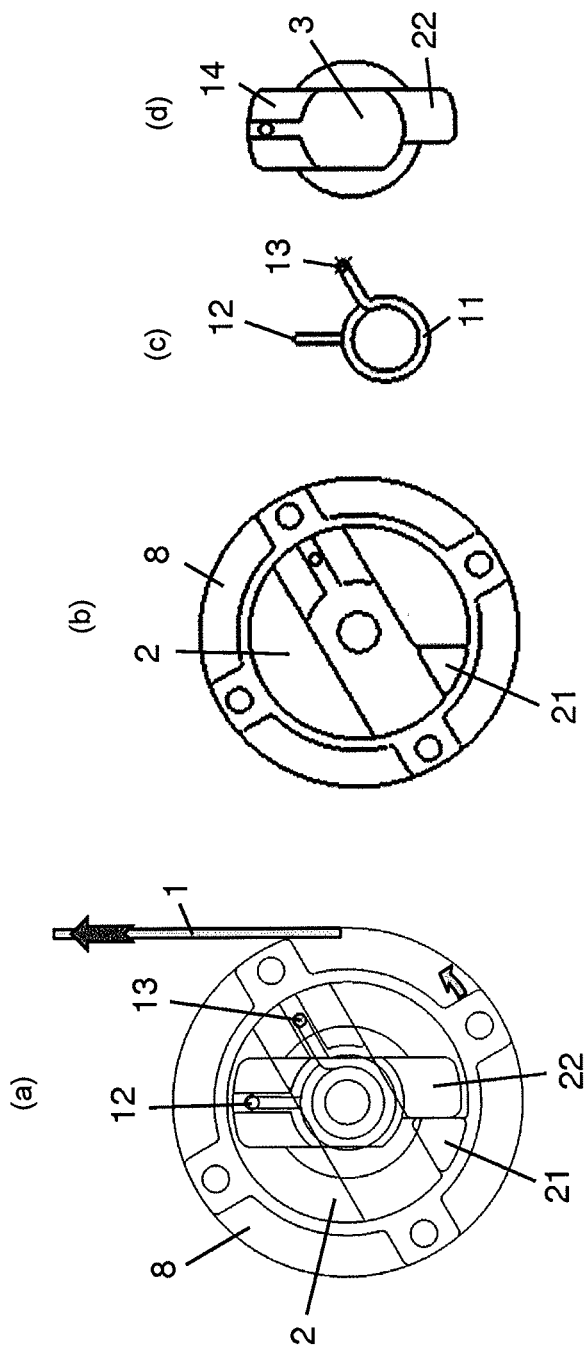

In FIG. 1, it is shown the electric seatbelt retractor including a U-shaped frame with two opposing journals 6 and 7 for fixing the retractor at a vehicle structure, a spindle 2 onto which a seatbelt 1 is wound up and an electric motor 4 which is coupled directly or can be coupled via a clutch with the spindle 2. The spindle 2 includes a central through hole in which a rotor (or axle) 3 is arranged. At its left end, a drive wheel 5 is fixed at the rotor 3, which engages with another gear wheel of a not shown gear mechanism arranged between the spindle 2 and the electric motor 4. The gear mechanism transmits the rotational movement of the electric motor 4 via the drive wheel 5 to the rotor 3. The rotor 3 further includes at its other end a radial flange 14 with an axial directed recess 18 at an outer section and a central pin 19 extending at the end. Furthermore, a cup 8 is provided which is fixed to the spindle 2. Therefore, the cup 8 can be also understood as a part of the spindle 2. In an outer section of the cup 8, it is provided a recess 17, which is realized by an axial through hole.

At the pin 19 of the rotor 3, a spring 11 is arranged which includes a coil section surrounding the pin 19 and two ends 12 and 13 extending in two opposing axial directions to the outside from the coil section. The spring 11 is kept in position by the pin 19 and engages with its first end 12 into the recess 18 of the flange 14 of the rotor 3 and with its other end 13 into the recess 17 of the cup 8. Therefore, the spring 11 is fixed in circumferential direction with the first end 12 with the rotor 3 and with the second end 13 with the cup 8 and the spindle 2. The spring 11 includes several coils in the coil section with which the spring 11 embraces the pin 19. The ends 12 and 13 of the spring 11 are formed as radial arms which are bent at their ends in axial directions extending to the outside, away from the coil section. When the rotor 3 and the spindle 2 are undergoing a relative movement to each other, the coils of the coil section are tensioned or expanded depending on the status of the spring 11 and the direction of the rotation of the relative movement. In any case the spring 11 enables a relative movement of the spindle 2 to the rotor 3 with torsional tensioning or expanding the spring 11.

Figure 18:
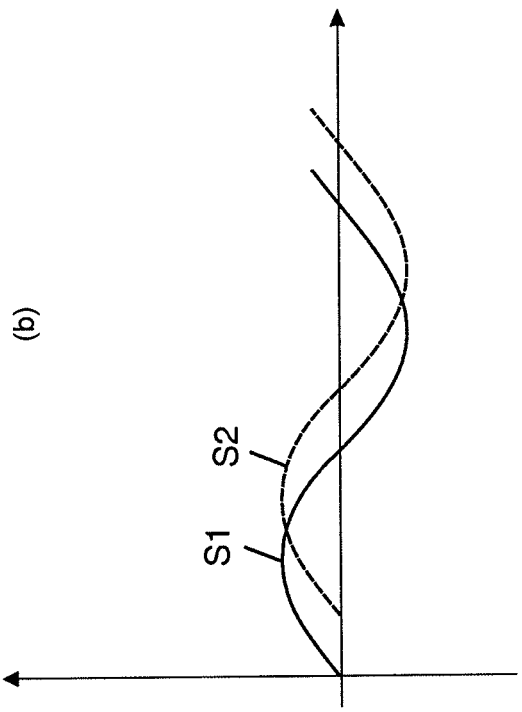
FIGS. 18(a) and (b) show the magnetic wheel and the sensor device in front view.
Figure 18:
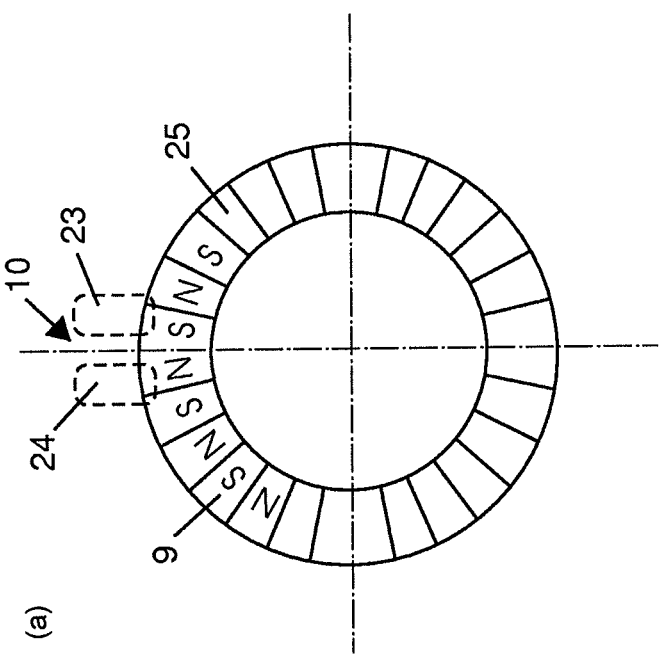

Furthermore, a magnetic wheel 9 is provided, which is also shown in FIGS. 18(a) and (b) from the front side. The magnetic wheel 9 includes a plurality of magnet poles 25 and is fixed at the cup 8, so that the magnetic wheel 9 is also fixed versus the spindle 2. The magnet poles 25 are designed with identical dimensions in a ring-shaped arrangement at the outer circumference of the magnetic wheel 9 on a common diameter. Furthermore, the magnetic wheel 9 is arranged concentric to the axis of the spindle 2, so that the magnet poles 25 are also arranged concentric to the axis of the spindle 2. Furthermore, the magnet poles 25 are arranged with alternating south and north poles, which create an alternating magnetic field in axial direction to the outside of the cup 8.

The cup 8 and the end of the spindle 2 extending through the right journal 7 of the frame are encapsulated by a cup-shaped housing 16 which is attached at the journal 7 of the frame. At the inside of the housing, it is arranged a sensor device 10 with for example two sensors 23 and 24 like Hall sensors, which are positioned face to the magnet poles 25 of the magnetic wheel 9. The sensors 23 and 24 are positioned with a defined distance to each other in the circumferential direction which enables a detection of the direction in which the spindle 2 turns versus the housing 16 and the frame by detecting an offset of the signals S1 and S2 generated by the sensors 23 and 24 like shown in the right illustration of FIGS. 18(a) and (b).

If the spring 11 is tensioned by a first relative movement between the rotor 3 and the spindle 2, the created tension force is used afterwards in a following situation to initiate a second relative movement of the spindle 2 versus the rotor 3 which is detected by the sensor device 10. The sensor device 10 creates thereby a signal which depends on the direction of the relative movement and which is used to control the electric motor 4 and to activate the electric motor 4 to drive the spindle 2 further in the same direction.

Figure 2:
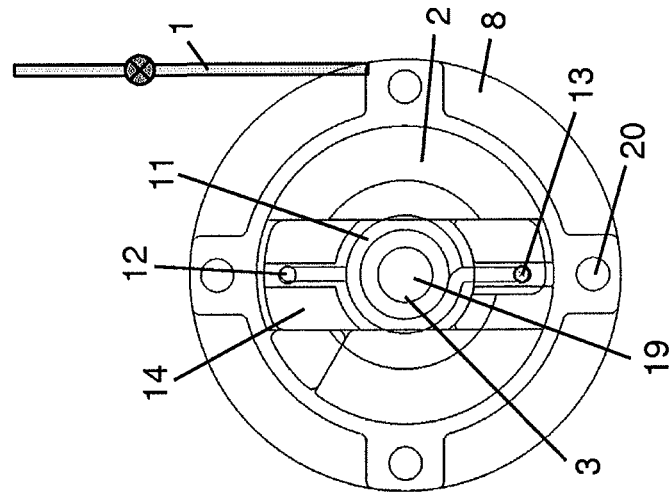
FIG. 2 shows the electric seatbelt retractor in view to the front side with a spindle, a rotor and a spring arranged between both parts.

In FIG. 2, the retractor is shown in a view to the front side at the rotor 3 and the spindle 2, wherein the housing 16 and the frame of the retractor have been deleted to facilitate the illustration. The spring 11 is arranged with the coil section embracing the central pin 19 of the rotor 3. The first end 12 is connected with the flange 14 of the rotor 3 and the second end 13 is connected with the cup 8 in circumferential direction, wherein the cup 8 is also fixed to the spindle 2, so that the second end 13 is also fixed in circumferential direction to the spindle 2.

The sensor device 10 generates a signal depending on the direction of the relative rotation of the spindle 2 versus the rotor 3. As the rotor 3 is not moving before the activation of the electric motor 4, the relative rotation of the spindle 2 versus the rotor 3 is identical with the relative rotation of the spindle 2 versus the frame and the housing 16 of the retractor and versus every other retractor-fixed part. As the sensor device 10 is fixed at the housing 16, the relative rotation or movement of the spindle 2 versus the rotor 3 can be detected by the sensor device 10 fixed at the housing 16 of the detector. The sensor device 10 is connected via a signal line with a central processing unit 15 which is also connected with a signal line with the electric motor 4. The arrangement of the sensor device 10 at the housing 16 facilitates the design structure and the connection of the sensor device 10 with the central processing unit 15 significantly, because the sensor device 10 is fixed at a non-moving part. Alternatively, the sensor device 10 may also be fixed at the spindle 2 or at the rotor 3 to detect the relative movement between both parts, wherein in this case the signal needs to be transmitted via a moving contact like for example a collector ring.

In the following, the control method is explained by the FIGS. 3(a) to 17(d). In all illustrations, the rotor 3 is arranged in a position starting from an upright position, where the flange 14 is arranged together with the first end 12 of the spring 11 in the 12 o'clock position to facilitate the understanding of the movements. In general in the left illustration, there are shown the spindle 2 with the cup 8, the rotor 3 with the flange 14 and the spring 11 arranged between them. In the right illustration, there are shown the spindle 2, the rotor 3 and the spring 11 as single parts in the relevant orientations.

In the FIGS. 3(a)-(d), the electric retractor with the spindle 2 and the rotor 3 is shown in a position in which the seatbelt 1 is wound up completely onto the spindle 2. This position is designated also as the parking position. The spring 11 is relaxed and both ends 12 and 13 of the spring 11 are arranged opposite to each other with an angle of 180 degrees between them.

When the occupant starts to apply the seatbelt 1, he or she pulls the seatbelt 1 for a short length out of the parking position, which is shown in FIGS. 4(a)-(d) by the arrows in the left illustration. The rotor 3 is not rotating, so that the flange 14 and the first end 12 of the spring 11 are not moved out of the 12 o'clock position. The spindle 2 rotates for a small angle like for example 5 to 20 degrees versus the not rotating rotor 3 in the counter clockwise direction, so that the second end 13 of the spring 11 is moved versus the first end 12 and the spring 11 is tensioned in the coil section. The orientations of the spindle 2, the spring 11 and the rotor 3 are shown in the right illustrations. The spindle 2 rotates versus the rotor 3 and also versus the housing 16 and the sensor device 10 fixed thereon. The housing 16 is attached at the frame of the retractor and is therefore in this case a retractor-fixed part. The movement of the spindle 2 is a first relative movement on which the spring 11 is tensioned and which generates two different signals S1 and S2 in the sensors 23 and 24 with an offset to each other, wherein the offset of the signals S1 and S2 depends on the direction of the rotation of the spindle 2. In the present case, the spindle 2 rotates in the counter clockwise direction, so that the sensor 23 generates the signal S1 and the sensor 24 generates the time-delayed signal S2. The signals S1 and S2 are processed in the central processing unit 15 which generates another signal to control the electric motor 4 which is activated to drive the spindle 2 further in the counter clockwise direction like shown in FIGS. 5(a)-(d) by the circular arrow in the left illustration. The rotor 3 and the first end 12 of the spring 11 are driven then together by the electric motor 4 in the counter clockwise direction to follow the pull-out movement of the spindle 2. As far as the occupant pulls the seatbelt 1 out of the parking position with a constant pull-out force and the rotor 3 is driven to follow the spindle 2 with an identical rotational speed, the orientation of both parts to each other is not changed and the spring 11 is kept in the tensioned status. This orientation is kept until the occupant stops the pull-out movement and locks the tongue of the seatbelt 1 in a vehicle-fixed buckle which is not shown.

As the spring 11 is kept in the tensioned status during the pull-out movement until the locking of the tongue, the spindle 2 is rotated after locking the tongue in the buckle by the spring 11 in the clockwise direction versus the rotor 3 like shown by the arrow in the left illustration of FIGS. 6(a)-(d) afterwards when the spring 11 is expanding. This rotation of the spindle 2 when being driven by the spring 11 is a relative movement to a second direction, which is oriented opposite to the first direction of the first relative movement when the spring 11 is tensioned in FIGS. 4(a)-(d). This short rotation of the spindle 2 when driven by the spring 11 is detected again by the sensor device 10 which generates therefore two signals S1 and S2 having an offset which indicates the direction of the rotation. As the spindle 2 is driven in the pull-in direction, which is the second direction in the meaning of this description, the sequence of the signals S1 and S2 is reversed in comparison to the illustration in FIGS. 18(a) and (b). The signals S1 and S2 are processed in the central processing unit 15 to trigger the electric motor 4 to drive the spindle 2 in the clockwise direction to the pull-in possible slack out of the seatbelt until the seatbelt 1 is in contact with the chest of the occupant like in FIGS. 6(a)-(d).

When the slack is pulled out of the seatbelt 1, the spindle 2 is driven in the pull-in direction, wherein the movement of the spindle 2 is retarded at the end of the movement until the spindle 2 is blocked. As soon as the spindle 2 is blocked, the electric motor 4 and the rotor 3 perform a further rotation versus the blocked spindle 2, which is shown by the arrow in FIGS. 7(a)-(d). This first relative movement of the rotor 3 versus the spindle 2 tensions the spring 11. The orientation of the spindle 2, the rotor 3 and the spring 11 is kept when the occupant does not perform any further movement afterwards. The spindle 2 is therefore preloaded in the pull-in direction, so that the seatbelt 1 is abutting with a slightly higher restraining force resulting from the tension of the spring 11.

When the occupant performs in this situation a movement forward for example to operate an instrument panel function or otherwise lean forward, he or she pulls the seatbelt 1 in the pull-out direction against the tension of the spring 11, which is shown by the arrow in the left illustration of FIGS. 8(a)-(d). This pull-out movement of the seatbelt 1 results in a relative movement of the spindle 2 versus the standing rotor 3 and a relative movement of the spindle 2 and the cup 8 to the housing 16 and the sensor device 10. This movement is detected by the sensor device 10 which generates therefore a signal S1 and S2 which is processed in the central processing unit 15 to generate a second signal to trigger the electric motor 4 to drive the rotor 3 in the pull-out direction of the seatbelt 1. The rotor 3 is therefore driven to follow the rotation of the spindle 2. In the ideal case the rotor 3 is driven to follow the spindle 2 without changing the tension of the spring 11.

When the occupant stops the forward movement, also the pull-out force acting on the spindle 2 is stopped and the spindle 2 is not rotating versus the housing 16 and the sensor device 10 anymore. The stop of the movement generates then a change of the signals S1 and S2 of the sensor device 10, which is processed in the central processing unit 15 to a control signal to stop the electric motor 4. As the spring 11 is still tensioned by the first relative movement of the occupant when he or she leans forward, the spindle 2 is afterwards driven by the spring 11 in the second direction, which is here the pull-in direction, which is shown in FIGS. 9(a)-(d). The illustration in FIGS. 9(a)-(d) shows the spring 11 after the spindle 2 has been driven and when the spring 11 is already expanded. This relative movement of the spindle 2 versus the rotor 3 and versus the housing 16 in the second direction is detected by the sensor device 10 to activate the electric motor 4 to drive the rotor 3 in the second direction, in this case the pull-in direction which is shown in FIGS. 10(a)-(d). The rotor 3 is driven therefore in the pull-in direction and drives the spindle 2 further in the pull-in direction via the spring 11 until the seatbelt 1 is in contact with the chest of the occupant sitting in the normal seating position.

As soon as the seatbelt 1 is in contact with the chest of the occupant, the movement of the spindle 2 is retarded and finally stopped while the rotor 3 is further driven by the electric motor 4 in the pull-in direction, which is shown in FIGS. 11(a)-(d). During this first relative movement, the spring 11 is tensioned by moving the first end 12 versus the standing second end 13 of the spring 11.

When the occupant releases the tongue form the buckle, the spring 11 expands and drives the spindle 2 in the second direction in the pull-in direction like shown in FIGS. 12(a)-(d). This relative movement of the spindle 2 versus the rotor 3 and versus the housing 16 is detected by the sensor device 10 and the electric motor 4 is triggered again to drive the rotor 3 in the second direction, in this case the second direction is the pull-in direction like shown in the FIGS. 13(a)-(d). The movement of the rotor 3 is transmitted in this case again via the spring 11 to the spindle 2 which is driven therefore also in the pull-in direction of the seatbelt 1. The seatbelt 1 is retracted then until the parking position is reached.

The spindle 2 is retarded and finally stopped when reaching the parking position, while the electric motor 4 drives the rotor 3 further to preload the spring and holding the preloading for a predetermined time like shown in FIGS. 14(a)-(d). When the buckle sensor detects in this case that the tongue is not locked, the electric motor 4 is activated again to drive the rotor 3 in the other direction until the parking position from FIGS. 15(a)-(d) is reached. The last step is necessary to distinguish the pull-in movement of the seatbelt 1 into the parking position from the pull-in movement when the occupant returns to the seated position after leaning forward.

In each of the described cases, the electric motor 4 is triggered upon a signal which is generated when the spindle 2 performs a relative movement to the housing 16 and the sensor device 10 attached thereto. As the rotor 3 is standing before the activation of the electric motor 4, this relative movement is identical with the relative movement between the spindle 2 and the rotor 3. The electric motor 4 is activated to drive the rotor 3 then in the same direction like the spindle 2 moving before. The relative movement of the spindle 2 which is detected by the sensor device 10 is generated either by the occupant itself, when he or she pulls the seatbelt 1 like for example from the parking position or to forward. Alternatively, the relative movement of the spindle 2 can also be initiated by the spring 11 when the spring 11 is tensioned in a foregoing step and expands afterwards to drive the spindle 2 preferably in the pull-in direction. In all of these cases, the relative movement is enabled by the spring 11 arranged between the spindle 2 and the rotor 3.

Furthermore, the webbing sensitive blocking of the spindle 2 is also realized by using the spring 11 like described with the FIGS. 16(a)-17(d). The rotor 3 includes at the opposite side to the flange 14 a radial outwardly directed finger 22. The spindle 2 is provided with a protrusion 21 at the axial front side which is directed in the left illustration of FIGS. 16(a)-(d) towards the observer.

In FIGS. 16(a)-(d), it is shown the orientation of the spindle 2 and the rotor 3 during the normal use, when the seatbelt 1 is applied, like in FIGS. 7(a)-(d). When the seatbelt 1 is pulled-out with a very high acceleration like indicated by the arrow in FIGS. 17(a)-(d), the spindle 2 rotates in the counter clockwise direction in the illustration until the protrusion 21 abuts at the finger 22 and stops therefore the further rotation of the spindle 2. As the rotor 3 is blocked in this case via the deactivated electric motor 4, also the spindle 2 is blocked against further rotation in the pull-out direction by the protrusion 21 which is abutting at the finger 22.

While the above description constitutes the preferred embodiment of the present invention, it will be appreciated that the invention is susceptible to modification, variation and change without departing from the proper scope and fair meaning of the accompanying claims.

The invention claimed is:

1. A control method for an electric seatbelt retractor comprising the steps of,
   providing a spindle and a seatbelt wound thereon,
   providing an electric motor driving the spindle via a rotor in a pull-in direction or in a pull-out direction when activated,
   providing a sensor device detecting the movement of the spindle,
   providing a spring which is arranged between the spindle and the rotor enabling a relative movement of the spindle to the rotor or to a retractor-fixed part, and
   controlling the electric motor by a signal of the sensor device generated by the relative movement of the spindle to the rotor or the retractor-fixed part with a torsional tensioning or torsional expanding of the spring,
   wherein the controlling step further comprises the steps of,
   tensioning the spring by a first relative movement of the spindle to the rotor or to the retractor-fixed part in a first direction,
   driving the spindle, by the tensioned spring, subsequently to a second relative movement of the spindle to the rotor or to the retractor-fixed part in a second direction, which is oriented opposite to the first direction such that the tensioned spring only initiates a short rotational movement of the spindle between 5 and 20 degrees, and
   generating the signal by the sensor device when detecting the second movement of the spindle, by which the electric motor is activated to drive the spindle in the second direction.

2. The control method according to claim 1, further comprising the step of activating the electric motor in the pull-out direction of the seatbelt when the sensor device detects the relative movement of the spindle in the pull-out direction to the rotor or to the retractor-fixed part when the seatbelt is pulled out from a parking position.

3. The control method according to claim 2, further comprising, the electric motor is activated in the pull-in direction of the seatbelt after a buckling up of the seatbelt.

4. The control method according to claim 1, further comprising, the electric motor is activated in the pull-in direction of the seatbelt when the sensor device detects the relative movement of the spindle in the pull-in direction to the rotor or to the retractor-fixed part after an unbuckling the seatbelt from a vehicle-fixed buckle.

5. The control method according to claim 1, further comprising the steps of,
   tensioning the spring before a releasing the seatbelt from a vehicle-fixed buckle against the pull-in direction of the seatbelt, and
   driving the spindle by the spring after releasing the seatbelt from the buckle in the pull-in direction, and
   activating the electric motor by the signal of the sensor device detecting the rotation of the spindle to the rotor or to the retractor-fixed part in the pull-in direction to drive the spindle in the pull-in direction.

6. An electric seatbelt retractor comprising,
   a spindle and a seatbelt wound thereon, the spindle including a central through hole in which a rotor is arranged such that the rotor passes through the spindle,
   an electric motor driving the spindle via the rotor in a pull-in or a pull-out direction when activated,
   a sensor device detecting a movement of the spindle, and
   a spring arranged between the spindle and the rotor enabling a relative movement of the spindle to the rotor or to a retractor-fixed part, wherein,
   the electric seatbelt retractor is configured such that the electric motor is controlled by a signal of the sensor device with a torsional tensioning or a torsional expending of the spring,
   the spring is tensioned by a first relative movement of the spindle to the rotor or to the retractor-fixed part in a first direction,
   the tensioned spring drives the spindle subsequently to a second relative movement of the spindle to the rotor or to the retractor-fixed part in a second direction, which is oriented opposite to the first direction, and
   the sensor device generates the signal when detecting the second movement of the spindle, by which the electric motor is activated to drive the spindle in the second direction.

7. The electric seatbelt retractor according to claim 6, further comprising,
   the sensor device comprises a sensor and a magnetic wheel, wherein,
   the sensor is fixed with respect to a frame of the retractor, and
   the magnetic wheel is fixed with respect to the spindle.

8. The electric seatbelt retractor according to claim 7, further comprising, the magnetic wheel having a plurality of magnets having different polarities, which are arranged at a common diameter with alternating poles in circumferential direction.

* * * * *